United States Patent Office 3,649,585
Patented Mar. 14, 1972

3,649,585
STABILIZATION OF (ETHYLENE BIS-STEAR-AMIDE)-LUBRICATED ABS WITH AN ACID
Donald Henry Foelsch, Williamsport, and Donald G. Manly, West Chester, Pa., assignors to Glyco Chemicals, Inc., New York, N.Y.
No Drawing. Filed Sept. 22, 1969, Ser. No. 860,045
Int. Cl. C08d 11/02, 11/04
U.S. Cl. 260—32.6 A           8 Claims

ABSTRACT OF THE DISCLOSURE

Enhancing heat stabilization of an ethylenediamine bis-stearamide lubricated ABS resin subject to discoloration at certain high temperatures by incorporating with the lubricating amount of said lubricant into the resin a minor amount, with respect to the lubricant, of a heat stabilizing effective amount of one or more of malic, citric and gallic acid; and the resulting heat stabilized ABS resins.

---

This invention is that of enhancing the heat stabilization of, and thus retarding, the heat discoloration of acrylonitrile, butadiene and styrene resins (ordinarily called ABS resin) which have incorporated in them a substantially minor amount of ethylene-diamine bis-stearamide (hereinafter briefly called EBS) as a lubricant. The invention also includes ABS-heat-stabilizer-modified ethylenediamine bis-stearamide melt compositions which contain a substantially minor amount of at least one of the ABS-heat-stabilization-enhancing substances malic acid, citric acid, and gallic acid. Also part of the invention are the resulting heat-stabilized ABS resins containing as a lubricant a substantially minor amount of the foregoing ABS-heat-stabilizer-modified EBS.

The ethylenediamine bis-stearamide concerned in this invention is N,N'-bis(n-octadecanoyl)-ethylenediamine.

The widespread use of ABS resins, of both the (jointly polymerized) graft type G and also the physical mixture or alloy type B, by injection molding and also extrusion in preparing so many and different articles and parts for various devices, is well known. However, use of these various ABS resins (of either the type G or type B) in their unpigmented or natural color is not as extensive as might be desired. That is so because when EBS is incorporated as lubricant in the ABS resin which then is subjected to high temperature (which might exceed about 200° C., such as 205° C. or more), such EBS-lubricated ABS is prone to yellowing and at times even darker discoloration.

Such discoloration all too often mitigates against use of such EBS-lubricated ABS in its natural color without pigment, for example, for a good white or nearly white molded product of utilitarian as well as decorative service. The relatively costly titanium dioxide pigment then would need to be incorporated in the ABS and thus add to the cost of the finished product, but is a serious drawback particularly with highly competitively sold products.

That disadvantage and others are overcome according to this invention by incorporating in the ABS resin the ABS-heat-stabilizer-modified EBS-lubricant composition of the invention in about the same proportion as that of the unmodified or usual EBS heretofore used as lubricant for the ABS. The then resulting heat-stabilized ABS resin is molded by injection molding or extrusion in the usual way without concern about exceeding 200° C. and even over 205° C. as the molding working temperature.

The ABS-heat-stabilizer-modified EBS compositions or melts of the invention are prepared by heating the EBS to melting at about 145 to 150° C. and admixing in it the substantially minor amount of the ABS-heat-stabilization-enhancing agent or substrate and continuing the mixing, usually with continued heating, until the added malic acid, citric acid, and/or gallic acid appears to dissolve in the EBS. That is noted by observing the clarification of the melt by the apparent disappearance of the added crystals or particles of the particular acid. A higher temperature can be used so long as it is below that at which the added acid will decompose.

The stirring can be continued for several minutes longer to assure uniform distribution of the acid in the molten EBS. These acids used to modify the EBS appear to be soluble in it in its molten state. The resulting uniform melt then is allowed to cool (as in a cooling pan or pans) to solidify. The resulting solid ABS-heat-stabilizer-modified EBS advantageously is ground or pulverized for suitable handling.

The proportion of the selected ABS-heat-stabilization-enhancing acid to be distributed within the thus melted EBS will vary with the particular acid. For example, as presently indicated, the ABS-heat-stabilization-enhancing quantity of malic acid should be at least about 0.75% of the heat-stabilized modified EBS melt composition. For citric acid that amount presently appears to be at least about 1.5% of the thus modified EBS melt composition; and with gallic acid the amount appears to be at least about 0.5% of the melt composition.

As is known, an ABS resin can be prepared by using (by weight) acrylonitrile in the range of from about 20 to 30%, butadiene rubber ingredient at from about 10 to 15%, with the balance being styrene to provide a total of 100%. That is so whether the ABS resin is of the graft type G (that is with the mixture of the respective amounts of the monomers and butadiene being copolymerized) or of the alloy type B (i.e. for which the separately, for example, emulsion polymerized monomers in the selected proportions are physically mixed together at high temperature as in a Banbury-type mixer), and in either case extruded and pelletized.

It is known that the substantially minor amount of EBS used as lubricant incorporated in the particular ABS resin will vary somewhat in relation to the varying toughness of the ABS resin depending on the particular selected proportions of the three respective starting materials, for example, from about 0.5% to at times possibly as much as 1% or sometimes even to 2% of the ABS. For that reason, and since the effective minimum of each of the three different ABS-heat-stabilization-enhancing acids (to be used in the EBS) differs so from that for the others, it is difficult to state a single minimum applicable to all three of them.

Hence, it is necessary to refer to the minimum qualitatively as an ABS-heat-stabilization-enhancing effective quantity, that is to say, a quantity sufficient to provide the ABS with adequate heat stabilization at the temperature at which it is to be subjected to the injection molding or extrusion of it, with the effective amount of the thus modified-EBS to be added as lubricant for the particular ABS.

While thte foregoing presently indicated respective minimum is given for each of the three different enhancing agent acids, it also occurs for similar reasons that it is difficult to state a numerical maximum applicable to all of them. For example, malic acid at 1.0% content of the so modified EBS gives still better color stabilization than its indicated minimum, and while 2% of citric acid in the modified EBS also gives better stabilization than its mentioned minimum and also so does 1% of gallic acid in the modified lubricant, gallic acid and each of the other two can be used at a still higher content in the modified lubricant.

For example, at 5% content of gallic acid in the so modified EBS no yellowing of the so lubricated ABS resin developed under molding conditions, but a slight gray was apparent. That possibly indicates that gallic acid could be used at a maximum under 5%. However, since a numerical maximum applicable to all of them under all variables cannot be given, the maximum also should be stated qualitatively as an amount below that at which some graying or undesirable discoloration occurs or at which a desired physical feature of the molded product is deleteriously effected.

The various aspects of the invention are illustrated, although not to be deemed limited, by the following examples (wherein all parts are by weight):

EXAMPLE 1

Preparation of and resulting ABS-heat-stabilizer-modified EBS and resulting melt compositions (A) With malic acid as the modifying agent: 99 parts of EBS are heated to 150° C. to melting in a stainless steel kettle equipped with heating jacket and removable stirrer. The stirrer is lowered into the melt and to it while stirring are added one part of racemic malic acid, and the heating continued until the melt clears showing dissolution of the malic acid particles. The liquid melt is transferred into a cooling pan to solidify and then is ground and pulverized.

(B) With citric acid as the modifying agent: Part (A) of this example is repeated by replacing its malic acid by two parts of citric acid ($1H_2O$). The finished product contains 1.83% of citric acid.

(C) With gallic acid as the modifying agent: Part (A) of this example is repeated by replacing its malic acid with one part of gallic acid ($1H_2O$). The end product contains 0.91% of gallic acid.

Example 1(A) can be repeated with 0.75 part of malic acid or with a greater amount such as 1.5 parts, or any other amount below that at which no physical feature of the lubricant-containing ABS is deleteriously effected at elevated temperatures by its containing a lubrication effective quantity of the so modified EBS.

Example 1(B) can be repeated with a lesser amount such as 1.5 parts of citric acid or a greater amount such as 2.5 parts of it, or any other amount such as qualitatively described in the immediately preceding Example 1.

The gallic acid in Example 1(C) can be replaced by a lesser amount such as 0.5 part of it or by a greater amount such as 3 or 4 parts of it, or any other amount within the foregoing qualitative range description.

Each of these just foregoing descriptions of repetitions of the different Examples 1(A), 1(B), and 1(C) correspondingly thus yields a modified EBS with its respectively different content of the particular heat stabilization-enhancing agent.

Any of the different ABS resins of the two different types, type G and type B, of the various proportions of the constituent members within the ranges indicated earlier above, can be provided with enhanced heat stabilization by replacing unmodified EBS usually incorporated as the lubricant by instead the respectively corresponding proportion of any ABS - heat - stabilizer - modified EBS broadly described earlier above and illustrated by Examples 1(A), 1(B) and 1(C) and any of the therewith described possible modifications of them, as exemplified by, but not restricted to, the following:

EXAMPLE 2

Graft type G ABS with malic acid-modified EBS lubricant 100 parts of a free running graft type G ABS, prepared, for example, by emulsion polymerization from about 23 parts of acrylonitrile, 15 parts of butadiene rubber constituent, and 62 parts of styrene, are dry blended with 4 parts of the malic acid-modified EBS of Example 1(A) on a two roll rubber mill for a couple of hours until the blending is uniform. The product is a heat stabilized EBS lubricant-containing, apparently high impact butadiene content graft type G ABS of injection grade, which contains about 3.9% of EBS and about 0.039% of malic acid.

Example 2 can be repeated with some other type G formulation ABS prepared, for example, also by emulsion polymerization from any other proportions of acrylonitrile, butadiene rubber ingredient and styrene within the respective ranges for them as disclosed in column 2, lines 30–34 above. Alternatively, the alloy type B of ABS can be produced as a physical mixture of the corresponding polymers prepared as by separate emulsion polymerization of each of the starting acrylonitrile, butadiene rubber ingredient, and styrene in any desired proportions within those same respective ranges of proportions, as described in column 2, lines 37–40 above.

Any of these other type G as well as the various type B ABS resins can be admixed in the same way as described in Example 2 with a desired lubricating-effective quantity of either the malic acid, or citric acid, or gallic acid-modified EBS, such as described in Example 1 above and its modifications, to provide the respectively corresponding heat-stabilized ABS resins.

The heat stabilization of the ABS having the ABS-heat-stabilization-enhancing acid agent according to the invention incorporated in it is illustrated by comparative heat tests, for example, by pigmenting an ABS resin such as that used in Example 2 with 5 parts of titanium dioxide per 100 parts of ABS to render that normally tan type G ABS resin white enough to accentuate any yellowing which might occur in the comparative heat tests.

Thus, 100 parts by weight of that type G ABS resin and 4 parts also by weight of the titanium dioxide pigment were mixed in a Henshel "Prodex" mixer (much like and larger in size than the ordinary Waring Blendor). The resulting blend of ABS and titanium dioxide pigment then was fed through a Sterling Extruder Company's extruder having a 1.5 inch diameter barrel of about twelve times that in length to achieve good mixing and melting and to yield a rod 7 millimeters in diameter. Seven sections of about one inch each were cut from one end of the rod, and one such section was retained. The other six sections were placed in an oven maintained at 400° F. One such section then was removed at the end of each successive five minute interval of a 30 minute period and mounted sequentially after the retained initial unheated section, for color comparison.

Another such seven sections of the same about one inch length each were cut from near the other end of the same rod, and one of them set aside and the other six placed in the same oven and treated in the same way as were the first six such heated sections, and similarly mounted after withdrawal from the oven.

Then a third set of seven such sections were cut from about the middle of that same rod and similarly handled as was each of the other two sets of seven such sections, thus giving three sets of such seven one inch length sections each from the same rod.

Similarly, 100 parts of that same type G ABS resin and 5 parts of titanium dioxide pigment and 4 parts of ordinary unmodified EBS were mixed in the Henshel "Prodex" mixer. Their resulting mix similarly was fed through the same Sterling extruder to give a similar final rod of the titanium dioxide pigmented type G ABS resin with incorporated EBS lubricant. From this second rod there were cut similarly three separate sets of seven sections each of one inch length. Each of these three separate sets then was separately handled in the same way as were the similar three sets of sections cut from the first rod which contained no EBS lubricant, that is, with one section of each set set aside and the other six placed in the same oven at the same temperature with one section removed after each consecutive five minute interval.

Then a third 100 parts of the same type G ABS resin and 5 parts of titanium dioxide pigment and 4 parts of the malic acid modified EBS similarly were mixed in the Henshel "Prodex" mixer and their resulting mix likewise fed through the Sterling extruder to give a third rod. That rod was similarly cut to give three separate sets of seven one inch long sections each, and each set of those seven sections then was handled with six heated in the oven maintained at the same temperature and removed at similar intervals as with the first two rods.

Each one inch test section was assigned a test color score for its extent of discoloration during its oven exposure, based on the following assigned scoring schedule:

| | |
|---|---|
| 9—white | 4—yellow-tan |
| 8—off white | 3—slight reddish tan |
| 7—trace yellow | 2—reddish tan |
| 6—pale yellow | 1—dark reddish tan |
| 5—yellow | 0—brown or black |

The thereby assigned scores for the six sections of each separate heat test run were added, giving the following results (in which the higher totals indicate the better heat stability because in the scale the higher the score the less the extent of discoloration):

| | Six sections score totals | | |
|---|---|---|---|
| Pigmented type G resin | Test run, 1st | 2d | 3d |
| Without any lubricant | 52 | 50 | 53.5 |
| With ordinary EBS lubricant | 43 | 43 | 47 |
| With malic acid-EBS lubricant | 52 | 49 | 53.5 |

Comparing the score totals for the pigmented type G ABS resin containing the malic acid-modified EBS lubricant with the scores for the sections of that ABS containing ordinary EBS lubricant and then with the scores for that ABS resin without any lubricant, shows that use of the malic acid-modified EBS lubricant practically completely overcame the discoloration which occurred in that resin containing ordinary EBS lubricant. In the heat test on the sections of the latter, they developed a pale yellow color within 10 minutes residence in the oven whereas the sections of the same resin which contained the malic acid-modified EBS lubricant developed such pale yellow color only after 20 minutes at that oven temperature.

The graft type G ABS resin sheet product of Example 2 similarly will require a longer time to show any discoloration when heated as in an oven at 205° C. than will a similarly prepared type G ABS resin sheet containing as the lubricant only the ordinary unmodified EBS.

It is beneficial that the EBS used have a neutralization value (i.e. NV) less than one and quite advantageous that it be about 0.4 which is the NV of the EBS used in the examples. The neutralization value is a measure of the amount of a standard sulfuric acid solution required to neutralize any unreacted ethylenediamine in the EBS. Use of EBS with an even lower NV, as about 0.25, is still better.

In this specification and its claims, the expression "substantially minor amount of ethylenediamine bis-stearamide" can be taken as intending an amount generally not exceeding about five parts of it per 100 parts of the resin.

So also by the expression "a substantially minor amount" as to any of the ABS-heat-stabilization-enhancing agents malic acid, citric acid and gallic acid, is intended an amount generally under about six parts of such acid per 100 parts of the EBS.

In preparing the heat-stabilizer-acid-modified EBS with either the malic acid, citric acid or gallic acid, instead of transferring the liquid melt to cooling pans after the selected acid is dissolved in the melted EBS, the melt may be dropped through a beading tower to provide beads of the resulting stabilizer-containing-modified EBS for use in such applications where that bead form is more convenient to use.

As to whether a selected amount of any one or more of these three EBS-modifying acids is effective or excessive can be determined by easy readily conducted preliminary tests wherein the selected amount of the EBS-modifying acid is added to the proportionate amount of EBS melted in a beaker and stirred (even by hand) to dissolve the added acid, and the resulting melt then cooled on a watch glass (or small pan) and disintegrated (even in a hand mortar) to a size merely small enough to enable suitably mixing it in the desired proportion with a small particle size ABS resin; then extruding their resulting mix and heat testing sections of the extruded rod under conditions like those of the heat test as described in cols. 4 and 5 above. Depending on the result of such heat test, the just described test, if needed, can be repeated with different proportions as indicated by the test result.

Those skilled in the polymer art especially in its portion concerned with ABS understand readily what is meant by the alloy type B ABS and also by the graft type G ABS resin. In any event, those concerned and skilled in this art can find the expression "graft type of polymer" or simply "graft polymer" defined in U.S. Pat. 3,445,350 (issued May 20, 1969) in its column 11 from lines 45 to 72, as a polymeric product which is made by the graft copolymerization technique as described in the Journal of Polymer Science, volume 8 (1952), page 260, etc.

While the invention has been explained by detailed description of certain illustrative embodiments of it, it is understood that various changes and modifications can be made in them within the scope of the appended claims which are intended also to cover equivalents of those embodiments.

What is claimed is:

1. The method of enhancing the heat stabilization of an acrylonitrile, butadiene and styrene resin which is subject to discoloration when heated to certain high temperatures when it contains ethylenediamine bis-stearamide as lubricant, which method comprises substantially uniformly incorporating in said resin a substantially minor amount of the ABS-heat-stabilizer-modified ethylenediamine bis-stearamide lubricant in the range of from at least an ABS-resin-lubricating-effective quantity to an amount generally not exceeding about 5 parts of said modified ethylenediamine bis-stearamide per 100 parts of said resin, said modified ethylenediamine bis-stearamide containing a substantially minor amount of at least one of the ABS-heat-stabilization-enhancing agents malic acid, citric acid, and gallic acid in the range of from at least the minimum ABS-heat-stabilization-enhancing-effective quantity to an amount generally under about six parts per 100 parts of said ethylenediamine bis-stearamide.

2. The method as claimed in claim 1, wherein the acid present in said minor amount is malic acid.

3. The method as claimed in claim 1, wherein the acid present in said minor amount is citric acid.

4. The method as claimed in claim 1, wherein the acid present in said minor amount is gallic acid.

5. An acrylonitrile, butadiene and styrene resin of the type called an ABS resin consisting essentially of said acrylonitrile, butadiene and styrene resin and substantially uniformly incorporated therein a substantially minor amount of the ABS-heat-stabilizer-moified ethylenediamine bis-stearamide lubricant in the range of from at least an ABS-resin-lubricating-effective quantity to an amount generally not exceeding about 5 parts of said modified ethylenediamine bis-stearamide per 100 parts of said resin, said modified ethylenediamine bis-stearamide containing a substantially minor amount of at least one of the ABS-heat-stabilization-enhancing agents malic acid, citric acid, and gallic acid in the range of from at least the minimum ABS-heat - stabilization - enhancing-effective quantity to an amount generally under about six parts per 100 parts of said ethylenediamine bis-stearamide.

6. A resin as claimed in claim 5 wherein said ABS-heat-stabilization-enhancing agent is malic acid.

7. A resin as claimed in claim 5, wherein said ABS-heat-stabilization-enhancing agent is citric acid.

8. A resin as claimed in claim 5, wherein said ABS-heat-stabilization-enhancing agent is gallic acid.

References Cited

UNITED STATES PATENTS

| 2,658,052 | 11/1953 | Signer et al. | 260—45.5 |
| 2,884,392 | 4/1959 | Clark | 260—28.5 |

MORRIS LIEBMAN, Primary Examiner

R. ZAITLEN, Assistant Examiner

U.S. Cl. X.R.

260—45.85, 879

UNITED STATES PATENT OFFICE
CERTIFICATE OF CORRECTION

Patent No. 3,649,585   Dated March 14, 1972

Inventor(s) Donald Henry Foelsch, et. al.

It is certified that error appears in the above-identified patent and that said Letters Patent are hereby corrected as shown below:

Column 2, line 4, "substrate" should read -- substance -- ; line 58, after "subjected to" insert -- in -- ; line 61, "thte" should read -- the -- .

Signed and sealed this 12th day of December 1972.

(SEAL)
Attest:

EDWARD M. FLETCHER, JR.        ROBERT GOTTSCHALK
Attesting Officer              Commissioner of Patents

FORM PO-1050 (10-69)